(12) United States Patent
Chen

(10) Patent No.: US 9,783,163 B2
(45) Date of Patent: Oct. 10, 2017

(54) VEHICLE ANTI-THEFT DEVICE AND VEHICLE ANTI-THEFT DEVICE CONTROL METHOD FOR SUPPLYING A CURRENT TO VEHICLE CIRCUITRY

(71) Applicant: Fu-Chieh Chen, Taichung (TW)

(72) Inventor: Fu-Chieh Chen, Taichung (TW)

( * ) Notice: Subject to any disclaimer, the term of this patent is extended or adjusted under 35 U.S.C. 154(b) by 0 days.

(21) Appl. No.: 15/054,139

(22) Filed: Feb. 26, 2016

(65) Prior Publication Data

US 2017/0247018 A1 Aug. 31, 2017

(51) Int. Cl.
| F02N 11/08 | (2006.01) |
| B60R 25/40 | (2013.01) |
| B60R 25/24 | (2013.01) |
| B60R 25/045 | (2013.01) |
| B60R 25/20 | (2013.01) |

(52) U.S. Cl.
CPC .......... *B60R 25/403* (2013.01); *B60R 25/045* (2013.01); *B60R 25/209* (2013.01); *B60R 25/24* (2013.01); *B60R 2325/101* (2013.01)

(58) Field of Classification Search
CPC ........ H02J 17/00; B60R 25/04; B60R 25/045; B60R 25/1007
USPC ..... 701/2; 320/137, 138; 123/179.25, 179.3; 200/42.01
See application file for complete search history.

(56) References Cited

U.S. PATENT DOCUMENTS

| 5,184,023 A * | 2/1993 | Carlo ...................... B60R 25/04 307/10.3 |
| 5,533,589 A * | 7/1996 | Critzer .................... B60R 25/04 180/287 |
| 5,729,192 A * | 3/1998 | Badger ................... B60R 25/04 307/10.2 |
| 6,227,158 B1 * | 5/2001 | LaBelle .................. B60R 25/04 123/179.3 |
| 2006/0049962 A1 * | 3/2006 | Okada ..................... B60R 25/24 340/901 |

* cited by examiner

*Primary Examiner* — Dalena Tran

(57) ABSTRACT

A vehicle anti-theft device, including a processor, a current control unit, a first bluetooth transmitter, and an operator, wherein the processor, the current control unit and a signal transmitter are linked to a vehicle starter battery. The processor is electrically connected to the current control unit, the first bluetooth transmitter, a vehicle electric generator, and battery cells of the starter battery. The processor is used to control operation of the current control unit, and the current control unit is used to control the starter battery to output current to the vehicle circuitry system. The current control unit includes a large current circuit and a small current circuit. The large current circuit is provided with a single-pole relay. The small current circuit comprises a self-resetting fuse.

1 Claim, 3 Drawing Sheets

VEHICLE ANTI-THEFT DEVICE AND VEHICLE ANTI-THEFT DEVICE CONTROL METHOD FOR SUPPLYING A CURRENT TO VEHICLE CIRCUITRY

BACKGROUND OF THE INVENTION (a) Field of the Invention

The present invention relates to vehicle anti-theft, and more specifically to a vehicle anti-theft device. When in an anti-theft mode, the vehicle anti-theft device controls the starter battery to only allow a low current output to supply the electric requirements of the vehicle electronic equipment, such as the electronic control unit, vehicle acoustics, and the like, and disables a high current output that would supply and start the vehicle starter motor, thereby preventing the vehicle from being stolen.

(b) Description of the Prior Art

Taiwan Utility Model Publication No. M416829 discloses an anti-theft lithium power battery, comprising a control device installed on the vehicle's lithium power battery, a remote control unit mounted on the vehicle exterior, and a voice broadcaster mounted on the vehicle interior, wherein the remote control unit is used to control the control device.

The control device is assembled from a circuit board, a battery management system mounted on the circuit board, a security system mounted on the circuit board, and at least one alarm system mounted on the circuit board and electrically connected to the security system.

The security system is assembled from a current control circuit, a vibration switch, and a diagnosis circuit. The current control circuit is used to control whether the lithium power battery outputs electric power or not. The vibration switch is used to activate the alarm system when the vehicle vibrates. The diagnosis circuit is controlled by the remote control unit, and decides whether to activate the current control circuit or not. When the current control circuit is activated and the vehicle driver wants to start the vehicle, or the vibration switch has been activated, the alarm system and the voice broadcaster are activated, and at the same time, the current control circuit continues to be activated until the remote control unit, through the diagnosis circuit, cuts off the current control circuit, the alarm system, and the voice broadcaster.

The abstract of Taiwan Utility Model Publication No. M416829 discloses that the security system consists of a current limiting circuit, and activating the current limiting circuit puts the vehicle in a state whereby current is flowing but the vehicle cannot be started. And when the current limiting circuit is activated, and a high current output is needed to start the vehicle, then the alarm system is activated, and the current limiting device continues to be activated.

However, the description in the specification of Taiwan Utility Model Publication No. M416829 does not describe how the technological measures enable disabling the vehicle from starting when the current limiting circuit is activated. And the vehicle starter battery uses an electrical connection between the current outlet terminals of the battery and the vehicle circuitry system to supply electric energy to the vehicle. The current limiting circuit disclosed in Taiwan Utility Model Publication No. M416829 is able to maintain its function to output a low current for use by the vehicle's electronic equipment when in an anti-theft mode, indicating that the battery and the vehicle circuitry system are in a closed circuit state enabling a current to flow. However, the battery can also output a high current to the vehicle through the same current circuit, and thus unable to achieve the effect of disabling the vehicle from starting as recorded in the abstract.

Furthermore, vehicle anti-theft devices of the prior art, including that disclosed in Taiwan Utility Model Publication No. M4168295, use a remote control unit or a chip key to perform an unlock or cancel operation when in an anti-theft mode. However, if the remote control unit or chip key is duplicated by a thief, then the thief is able to use the duplicated remote control unit or chip key to cancel the anti-theft settings and easily drive away the vehicle. Hence, because of the worry that the remote control unit or the chip key has been duplicated, the vehicle owner must visit the supplier and have the anti-theft device installed on the vehicle replaced together with the remote control unit or chip key.

SUMMARY OF THE INVENTION

The main object of the present invention lies in providing a vehicle anti-theft device, whereby when in an anti-theft mode, the vehicle anti-theft device controls the starter battery to only allow a low current output to supply the electric requirements of the vehicle electronic equipment, such as the electronic control unit, vehicle acoustics, and the like, and disables a high current output that would supply and allow the vehicle starter motor to be started, thereby preventing the vehicle from being stolen.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

Figure 1:
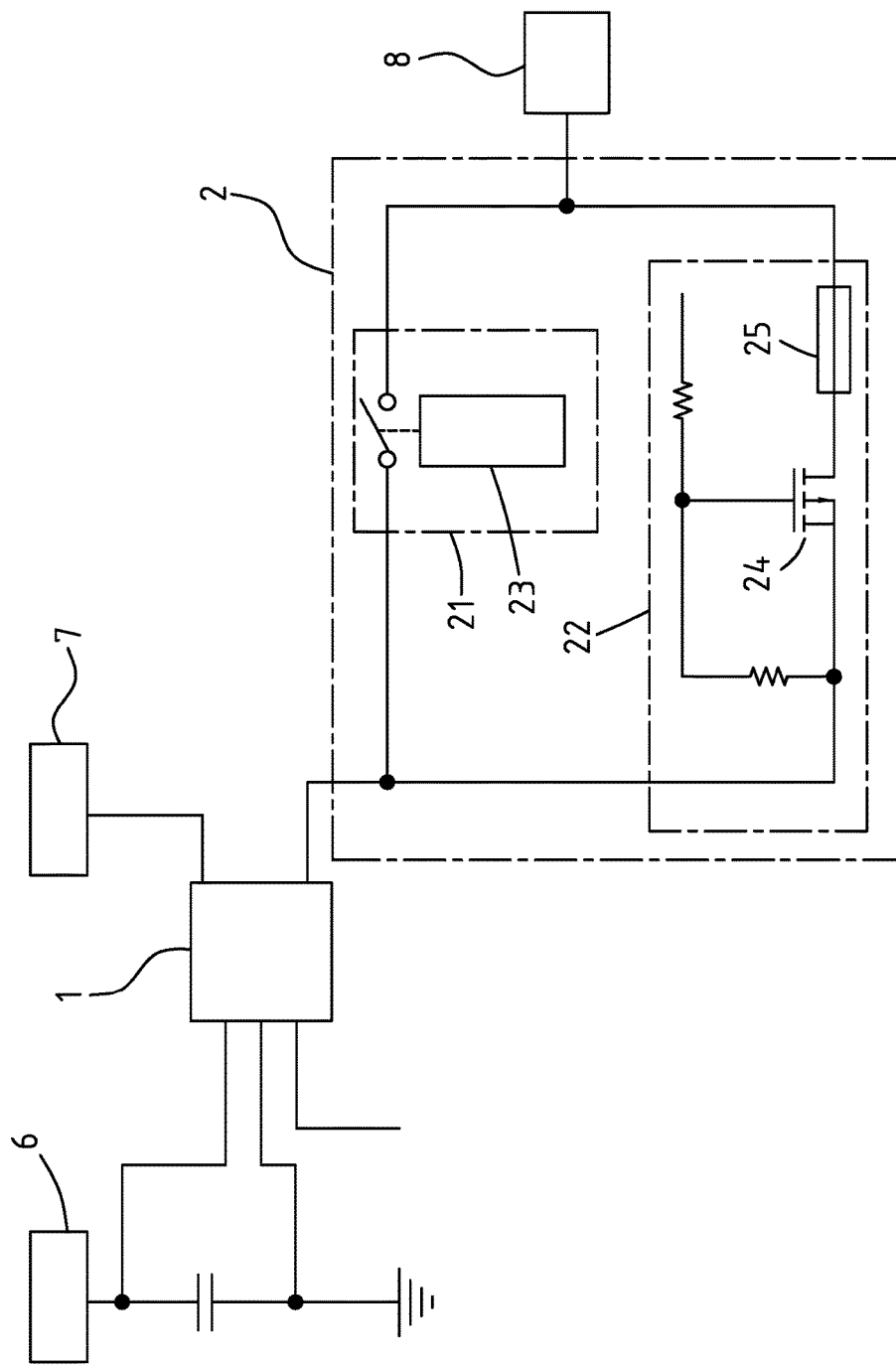
FIG. 1 is a circuit diagram of a processor and a current control unit of an embodiment of the present invention.

As shown in FIG. 1, which shows an embodiment of a vehicle anti-theft device of the present invention, comprising a processor 1, a current control unit 2, a first bluetooth transmitter (not shown), and an operator (not shown), wherein the processor 1, the current control unit 2, and a signal transmitter are mounted on a circuit board (not shown). The circuit board is mounted in the interior of a vehicle starter battery. The processor 1 is electrically connected to the current control unit 2, the first bluetooth transmitter, a vehicle electric generator 6, and battery cells 7 of a starter battery. The processor 1 is an integrated circuit, which is used to control operation of the current control unit 2. The current control unit 2 is electrically connected to current outlet terminals 8 of the starter battery, thereby controlling the starter battery to output current to the vehicle circuitry system. The current control unit 2 comprises a large current circuit 21 and a small current circuit 22. The large current circuit 21 is connected in parallel to the small current circuit 22. The large current circuit 21 is provided with a single-pole relay 23, and the small current circuit 22 is a current limiting circuit, thereby enabling the starter battery to supply a low current to the vehicle circuitry system. The small current circuit 22 comprises a self-resetting fuse 24, and the processor 1 controls the opening and closing activation of the single-pole relay 23 and the self-resetting fuse 24, thereby controlling the strength of the output current of the starter battery to the vehicle circuitry system.

In addition, the small current circuit 22 may selectively comprise a low current circuit breaker 25. The low current circuit breaker 25 is a small-scale circuit breaker (such as a relay) that controls a closed-open circuit state of the small current circuit 22. The processor 1 controls activation of the low current circuit breaker 25 in an unlocked state to enable closing and opening of the small current circuit 22. The processor 1 also controls activation of the low current circuit breaker 25 in an anti-theft lockout state to enable the small current circuit 22 to form a closed circuit. Moreover, under circumstances whereby the small current circuit 22 forms a closed circuit, the processor 1 controls activation of the low current circuit breaker 25 when the output voltage of battery cells 7 is below a specified safety voltage to enable closing and opening of the small current circuit 22.

The operator is a portable communication device, and may be a cell phone, but is not limited to a cell phone. The operator comprises a second bluetooth transmitter, moreover, the operator has a built-in application program. The processor 1 and the operator use a wireless connection between the first bluetooth transmitter and the second bluetooth transmitter to enable information to be transmitted between the processor 1 and the operator. Moreover, the operator executes the aforementioned application program to control the processor 1.

When the user operates the operator to execute the aforementioned application program, the user inputs a personalized set password, whereupon the password information is transmitted to the first bluetooth transmitter via the second bluetooth transmitter. The first bluetooth transmitter receives the password information and transmits the password information to the processor 1. The processor 1 is further provided with a password storage and verification unit. When the vehicle anti-theft device is in an unlocked state, the aforementioned application program enables the processor 1 to execute password setting/storage/change/verification operations and an anti-theft lockout operation. With the vehicle anti-theft device in an anti-theft lockout state, the aforementioned application program enables the processor 1 to execute password verification and unlocking operations.

Figure 2:
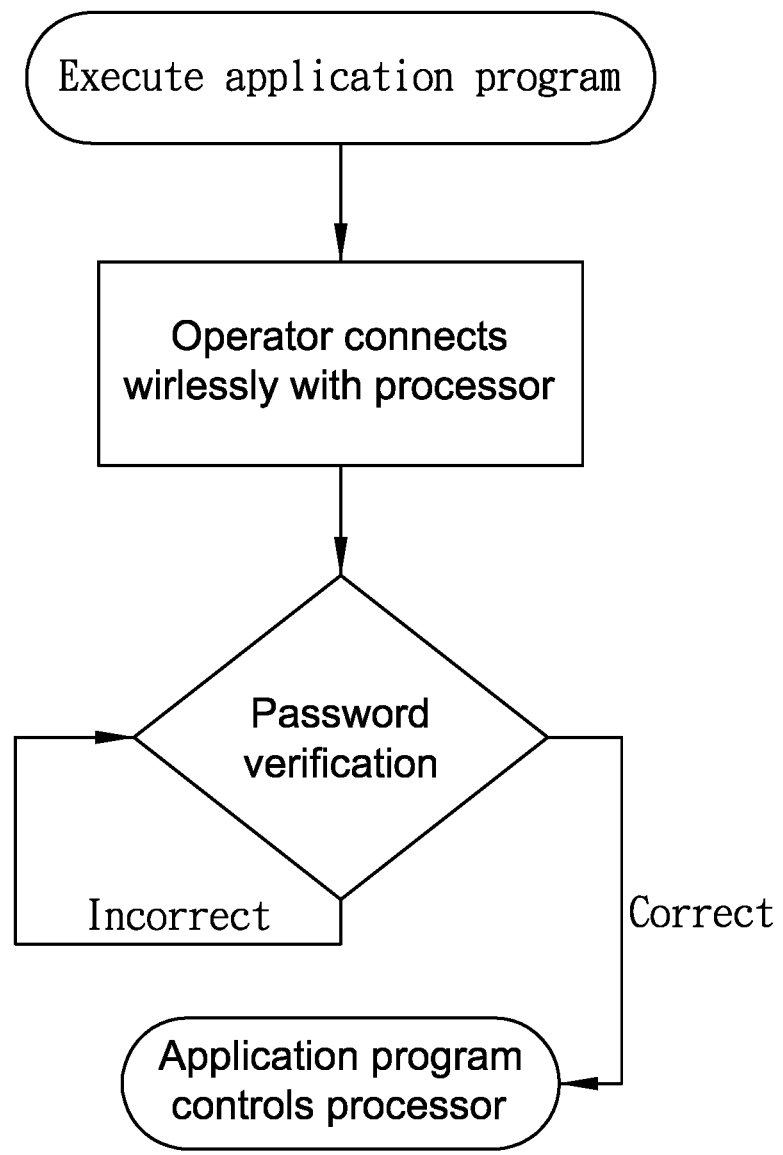
FIG. 2 is a logic block diagram of password verification of the embodiment according to the present invention.

Referring to FIG. 1 and FIG. 2, in a wireless connected state between the first bluetooth transmitter and the second bluetooth transmitter, when the user operates the operator to execute the aforementioned application program, the application program transmits the password information to the processor 1, whereupon the processor 1 executes password verification. When the password information corresponds with the user preset and stored password, then the user can operate the aforementioned application program to carry out a password changing operation or the operation to change the anti-theft lockout/unlocked state. When the password information does not correspond with the user preset and stored password, the user is unable to operate the aforementioned application program to carry out the password changing operation or the operation to change the anti-theft lockout/unlocked state. Moreover, because the password information was not verified, the processor 1 repeats execution of the password verification operation.

When the password transmitted by the aforementioned application program is verified to correspond with the preset password by the processor 1, then the operation to change the anti-theft lockout/unlocked state my be carried out.

Figure 3:
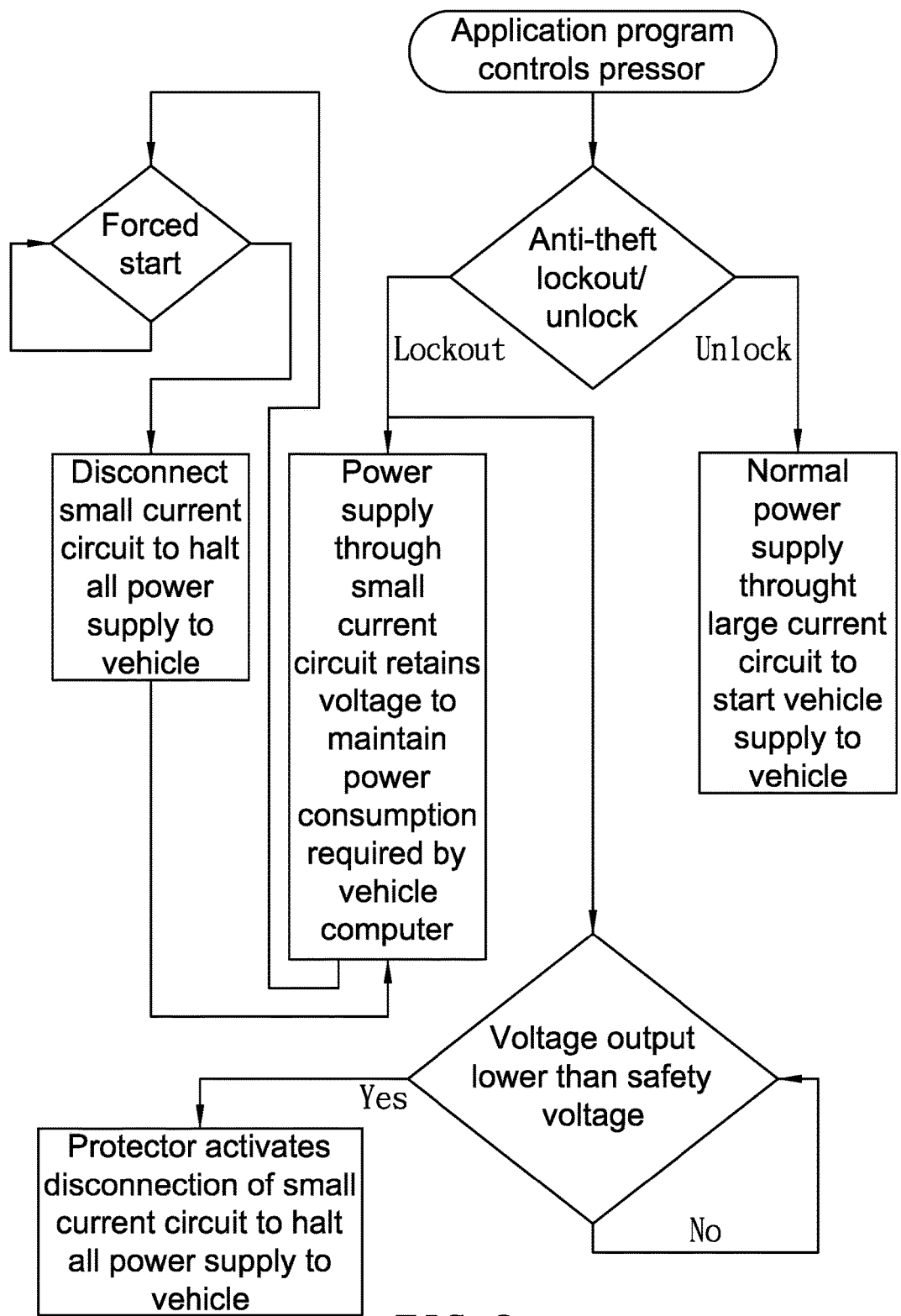
FIG. 3 is a logic block diagram of output current control of the embodiment according to the present invention.

Referring to FIG. 1 and FIG. 3, a control method for supplying a current to the vehicle circuitry system using the aforementioned embodiment to implement is as follows:

1. The aforementioned application program controls the processor 1 to carry out unlocking, and the low current circuit breaker 25 activates disconnection of the small current circuit 22. The single-pole relay 23 then activates the large current circuit 21 to form a closed circuit, thereby enabling the starter battery to output a high current or a low current to the vehicle circuitry system through the large current circuit 21, thus enabling the vehicle starter motor to start, and the vehicle electronic equipment, such as the electronic control unit, vehicle acoustics, and the like, also obtain a low current to enable operation thereof.

2. The aforementioned application program controls the processor 1 to carry out anti-theft lockout, and the low current circuit breaker 25 activates the small current circuit 22 to form a closed circuit and disconnection of the single-pole relay 23, thereby causing the large current circuit 21 to form a broken circuit. The starter battery is thus unable to output a high current to the vehicle circuitry system through the large current circuit 21, thus disabling the starter motor from starting, and the self-resetting fuse 24 is not activated. The small current circuit 22 maintains a closed circuit, and the starter battery is only able to output a low current to the vehicle circuitry system through the small current circuit 22, thereby avoiding having to return the vehicle to the supplier to reset the setup parameters of the vehicle electronic equipment, such as the electronic control unit, vehicle acoustics, and the like, because of shortage of power supply for a long period of time.

3. Based on the processor 1 executing anti-theft lockout, if a high current flows to the small current circuit 22, then the self-resetting fuse 24 disconnects the circuit and the starter battery is unable to output a current to the vehicle circuitry system. Accordingly, the vehicle starter motor can not be started by operating the start switch and the vehicle engine cannot be started, thereby preventing the vehicle from being stolen. The self-resetting fuse 24 self-resets within a short period of time of approximately a few seconds after disconnection thereof, which enables the small current circuit 22 to return to a closed circuit state. Accordingly, the starter battery can again output a low current to the vehicle circuitry system through the small current circuit 22 to satisfy the electric requirements of the vehicle electronic equipment, such as the electronic control unit, vehicle acoustics, and the like. In addition, the self-resetting fuse 24 is completely reset within a short period of a few seconds after disconnection, thereby preventing loss of setup parameters stored in memory of the vehicle electronic equipment, such as the electronic control unit, vehicle acoustics, and the like.

It is worth mentioning that the present invention uses verification of the personalized password set by the user to serve as a basis to determine whether or not to execute anti-theft lockout and unlock operations. Even if the operator is misplaced or lost, the user can use another operator with the aforementioned built-in application program to carry out the password changing operation, thereby avoiding the need to replace the vehicle anti-theft device when the operator is misplaced or lost, or because of the fraudulent practice of duplicating the remote control unit or chip key of vehicle anti-theft devices of the prior art.

Furthermore, there is no need for the user to specially purchase an operator, and can use communication equipment such as their own cell phone, and the like, to download the aforementioned application program from a cloud server through the Internet and install the program in the communication equipment. The aforementioned communication equipment can then be used as the operator to operate the processor 1.

Based on the prerequisite that the processor 1 executes anti-theft unlocking, the processor 1 controls activation of the low current circuit breaker 25 to enable disconnection of the small current circuit 22, thereby disabling the battery cells 7 from supplying electric energy to the current outlet terminals 8 through the small current circuit 22, and enabling the battery cells 7 to supply a high current or a low current to the current outlet terminals 8 through the large current circuit 21. Furthermore, based on the prerequisite that the processor 1 executes anti-theft lockout, the processor 1 controls activation of the low current circuit breaker 25 to enable the small current circuit 22 to form a closed circuit, thereby enabling the battery cells 7 to supply a low current to the current outlet terminals 8 through the small current circuit 22.

Based on the prerequisite that the processor 1 executes anti-theft lockout, when the output voltage of the battery cells 7 is below a specified safety voltage, then the processor 1 controls activation of the low current circuit breaker 25 to enable disconnection of the small current circuit 22, which disables the battery cells 7 from supplying electric energy to the current outlet terminals 8 through the small current circuit 22. The aforementioned safety voltage differs according to vehicle model and class, wherein the safety voltage value of a general small car is 12.3V; the safety voltage value of a heavy duty vehicle or passenger car is 24V; and the safety voltage value of a motorbike is 6.8V.

Accordingly, when problems of electric leakage occur in the vehicle circuitry system, or the user neglects to switch off the vehicle headlights, or under other conditions which can result in abnormal electric leakage of the cumulative electric energy of the battery cells 7, then the battery cells 7 can use the disconnection action of the low current circuit breaker 25 to enable the battery cells 7 to retain sufficient electric energy to supply the vehicle starter motor with the electric power required to execute a primary start thereof. Hence, a low voltage protection is formed that enables the user to start the vehicle engine after anti-theft unlocking, thereby facilitating the user to drive the vehicle to a vehicle service depot to overhaul the engine.

The processor 1 is further provided with a testing circuit, which is used to test various types of battery data of the battery cells 7, including the output voltage, output current, temperature, capacity, and the number of times the battery cells 7 has been charged and discharged. In a wireless connected state between the first bluetooth transmitter and the second bluetooth transmitter, and when the password transmitted by the aforementioned application program is verified correct by the processor 1, then the processor 1 transmits the aforementioned battery data to the operator, thereby enabling the user to learn the state of the starter battery. The aforementioned application program also transmits the aforementioned battery data to the server of the starter battery manufacturer or service provider through the Internet for use to provide services to the user, wherein the aforementioned server is able to transmit a warning message to the operator when there are anomalies in the battery data, thereby enabling the user to promptly carry out maintenance or replacement of the starter battery.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A vehicle anti-theft device control method for supplying a current to vehicle circuitry, which the vehicle anti-theft device, in combination, including a processor, a current control unit, a first bluetooth transmitter, and an operator, wherein the processor, the current control unit and a signal transmitter are linked to a vehicle starter battery; the processor is electrically connected to the current control unit, the first bluetooth transmitter, a vehicle electric generator, and battery cells of the starter battery; the processor is an integrated circuit, which is used to control activation of the current control unit; the current control unit is electrically connected to the current outlet terminals of the starter battery, thereby controlling current output of the starter battery to the vehicle circuitry system; the current control unit comprises a large current circuit and a small current circuit, and the large current circuit is connected in parallel to the small current circuit; the large current circuit is provided with a single-pole relay, and the small current circuit is a current limiting circuit, thereby enabling the starter battery to supply a low current to the vehicle circuitry system; the small current circuit comprises a self-resetting fuse and a low current circuit breaker, the low current circuit breaker is a circuit breaker that controls closing and opening of the small current circuit; the processor controls activation of the single-pole relay, the self-resetting fuse, and the low current circuit breaker, thereby controlling the strength of the output current of the starter battery to the vehicle circuitry system; the operator is a portable communication device, the operator comprises a second bluetooth transmitter, and the operator has a built-in application program; the processor and the operator use a wireless connection between the first bluetooth transmitter and the second bluetooth transmitter to enable the operator to execute the application program to control the processor;

wherein the vehicle anti-theft device implements a control method for supply current to the vehicle circuitry, and based on the wireless connection between the first bluetooth transmitter and the second bluetooth transmitter, the application program transmits password information to the processor, whereupon the processor executes password verification;

wherein the password information corresponds with the set password, then the application program enables executing a password changing operation or the operation to change the anti-theft lockout/unlocked state;

wherein the password information does not correspond with the set password, then the processor repeats execution of the password verification operation;

wherein the processor executes unlocking, then the low current circuit breaker activates disconnection of the small current circuit, and the single-pole relay activates the large current circuit to form a closed circuit, thereby enabling the starter battery to output a high current or a low current to the vehicle circuitry system through the large current circuit;

wherein the processor executes anti-theft lockout, then the low current circuit breaker activates the small current circuit to form a closed circuit, and the single-pole relay disconnects the large current circuit to form a broken circuit, thereby enabling the starter battery to output a low current to the vehicle circuitry system through the small current circuit based on the processor executing anti-theft lockout, a high current flows to the small current circuit, then the self-resetting fuse is disconnected, thereby preventing the vehicle engine from being started; the self-resetting fuse self-resets after disconnection, and the small current circuit returns to forming a closed circuit, thereby enabling the starter battery to output a low current to the vehicle circuitry system.

* * * * *